United States Patent [19]

Yoshida

[11] Patent Number: 5,355,465
[45] Date of Patent: Oct. 11, 1994

[54] DATA STORING DEVICE HAVING A PLURALITY OF REGISTERS ALLOTTED FOR ONE ADDRESS

[75] Inventor: Kazuyoshi Yoshida, Tokyo, Japan

[73] Assignee: Kabushiki Kaisha Toshiba, Kawasaki, Japan

[21] Appl. No.: 712,440

[22] Filed: Jun. 11, 1991

[30] Foreign Application Priority Data

Jun. 12, 1990 [JP]  Japan .................. 2-153595

[51] Int. Cl.⁵ ............. G06F 12/00; G06F 12/04; G06F 13/00
[52] U.S. Cl. ............................. 395/425; 395/400
[58] Field of Search ........................... 395/425; 364/200 MS File, 900 MS File

[56] References Cited

U.S. PATENT DOCUMENTS

| | | | |
|---|---|---|---|
| 4,344,130 | 8/1982 | Fung et al. | 395/425 |
| 4,368,515 | 1/1983 | Nielson | 395/425 |
| 4,432,067 | 2/1984 | Nielson | 395/425 |
| 4,713,748 | 12/1987 | Magar et al. | 395/375 |
| 4,811,202 | 3/1989 | Schabowski | 395/325 |

FOREIGN PATENT DOCUMENTS 104545 4/1984 Fed. Rep. of Germany.
064801 11/1982 United Kingdom.

OTHER PUBLICATIONS

"Software-Controlled Memory Duplication", by H. Al-Riahi, Microprocessors and Microsystems, vol. 9, No. 1, pp. 21-23, Jan. 1985.

*Primary Examiner*—Joseph L. Dixon
*Assistant Examiner*—Frank J. Asta
*Attorney, Agent, or Firm*—Finnegan, Henderson, Farabow, Garrett & Dunner

[57] ABSTRACT

A data storing device has at least first to third registers. When the first register is accessed, the second register is set into an accessible state in a preset cycle succeeding to a cycle in which the first register is accessed. The same address as that of the second register is assigned to the third register and access to the third register is inhibited in a preset cycle in which the second register is accessed. An access control circuit controls permission-/inhibition of access to the second and third registers.

6 Claims, 3 Drawing Sheets

DATA STORING DEVICE HAVING A PLURALITY OF REGISTERS ALLOTTED FOR ONE ADDRESS

BACKGROUND OF THE INVENTION

1. Field of the Invention

This invention relates to a data storing device used as an I/O (input/output) register of a single-chip microcomputer, for example, and more particularly to a data storing device having a plurality of registers allotted for one address.

2. Description of the Related Art

In general, in the I/O register of a single-chip microcomputer, one address is assigned to each register and only one register corresponding to a designated address can be accessed. In FIG. 1, the construction of an extracted portion of the above I/O register section and the peripheral circuit thereof is shown. A 16-bit address signal AD is input to an address decoder section 12 via an address bus 11. The address signal AD is decoded by the address decoder section 12 which in turn outputs a decoder signal ADOn (n=1, 2, 3, ...). 8-bit data stored in a register Rn (n=1, 2, 3, ...) corresponding to an address An (n=1, 2, 3, ...) designated by the signal ADOn is output in synchronism with the rise (or fall) of an R/W (read/write) control signal S and then transferred along a data bus 13.

However, with the above construction, when an attempt is made to increase the number of I/O registers to expand the register area, it is required to make various modifications for the address area. For example, when address areas allotted for the RAM and ROM are provided to follow an address area allotted for the I/O register, the address areas for the RAM and ROM must be modified in order to expand the register area. Otherwise, it becomes necessary to provide an additional register area in an address area arranged after the address area for the RAM or ROM.

In the former case, a large-scale modification is necessary and the specification must be greatly modified. Further, in the latter case, the modification scale can be made small, but the I/O register area is not continuous and becomes hard to deal with.

SUMMARY OF THE INVENTION

Accordingly, an object of this invention is to provide a data storing device which may permit the register area to be easily expanded even in a limited address area.

The above object can be attained by a data storing device comprising first data holding means for holding data; second data holding means set into an accessible state in a preset cycle succeeding to a cycle in which the first data holding means is accessed, third data holding means having the same address as that of the second data holding means allotted thereto and set into an access inhibition state in a preset cycle in which the second data holding means is accessed; and access control means for controlling permission/inhibition of access to the second and third data holding means.

In this invention, in order to effectively use a limited address area, two (second and third) data holding means are allotted for one address. The two (second and third) data holding means cannot be accessed only by selecting the address assigned to them and are selected according to a logical product of the selected address of the present cycle and an address selected in a cycle immediately preceding the present cycle. Therefore, even if the addresses assigned to the two (second and third) data holding means are the same, only one of the data holding means can be selected in one cycle. Thus, it becomes possible to allot two data holding means for one address.

Therefore, a data storing device in which the register area can be expanded in a limited address area can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
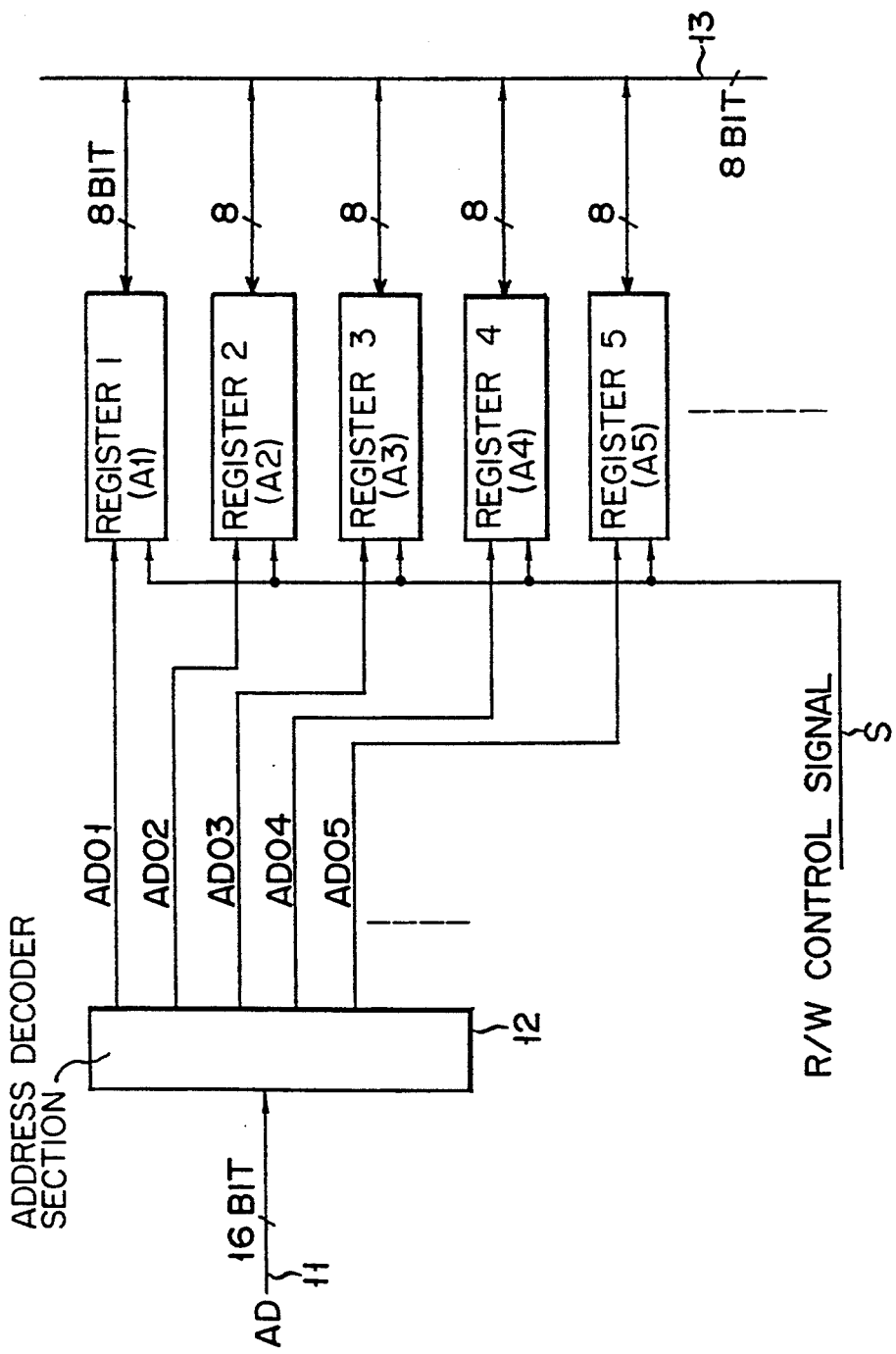
FIG. 1 is a circuit diagram showing the construction of the I/O register section of a single-chip microcomputer and a peripheral circuit thereof used as an example of the conventional data storing device.
Figure 2:
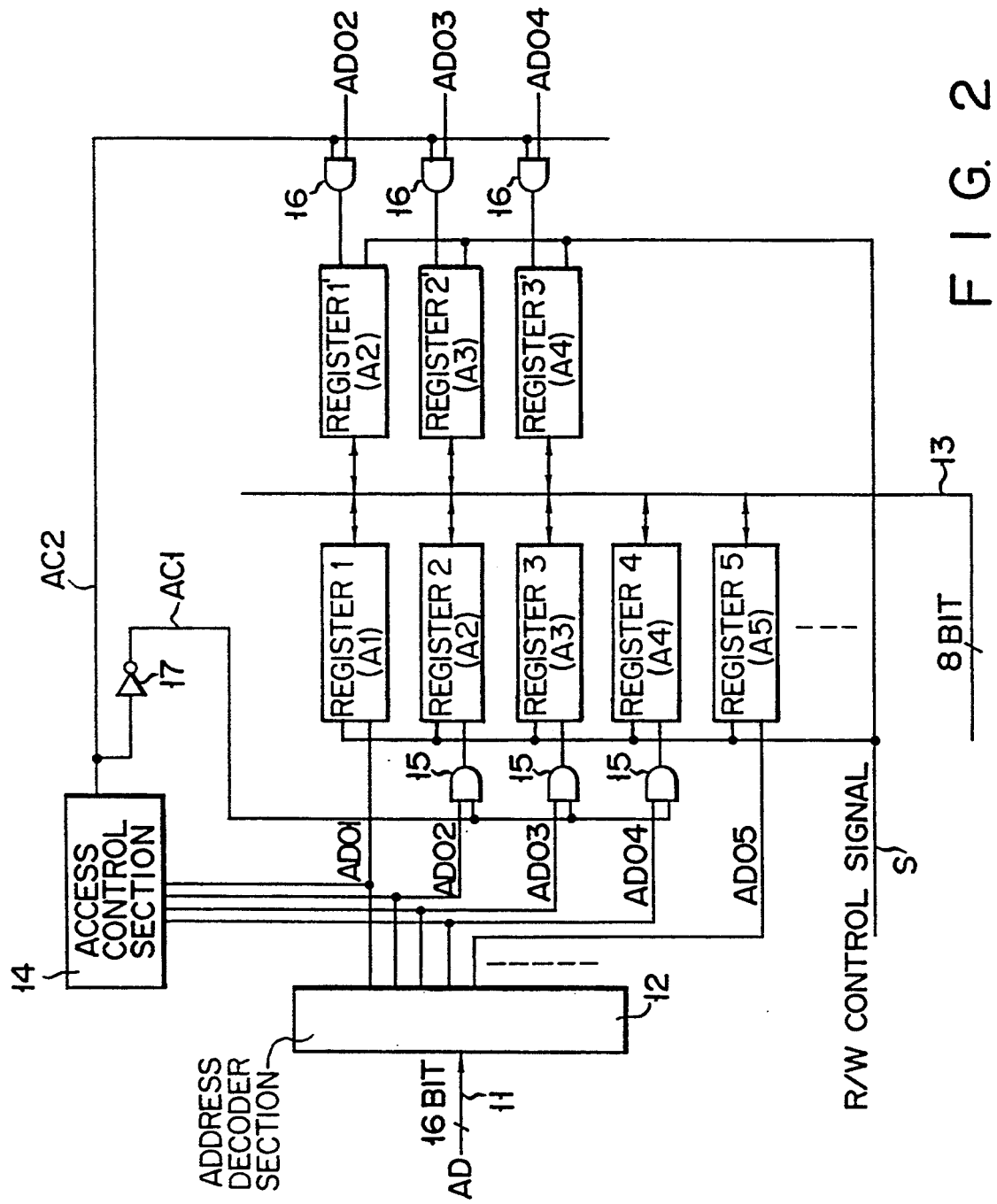
FIG. 2 is a circuit diagram showing the construction of the I/O register section of a single-chip microcomputer and a peripheral circuit thereof, for illustrating a data storing device according to one embodiment of this invention.

FIG. 2 is a circuit diagram showing the construction of the I/O register section of a single-chip microcomputer and a peripheral circuit thereof used as an example of a data storing device according to one embodiment of this invention. The circuit has a register section which is expanded to 16-bit construction by adding registers R1', R2' and R3' of 8-bit construction to the 8-bit register section shown in FIG. 1. However, since the 8-bit data bus 13 is used, two accessing operations are effected for each access to the 16-bit construction. Addresses A2, A3 and A4 are respectively assigned to the added registers R1', R2' and R3' and the addresses for the other registers R1, R2, R3, ... are kept unchanged. As a result, the addresses A2, A3 and A4 of the added registers R1', R2' and R3' are each assigned to two different registers.

An address decoder section 12 is supplied with a 16-bit address signal AD via an address bus 11 and a decoder signal ADOn (n=1, 2, 3, ...) is derived from the address decoder section 12. The signal ADO1 is supplied to the register R1 to which the address A1 is assigned, and the signals ADO2 to ADO4 are respectively supplied to one-side input terminals of AND gates 15 and one-side input terminals of AND gates 16. Further, the signals ADO1 to ADO4 are supplied to an access control section 14 and the signals ADO5, ... are supplied to the registers R5, ... to which the addresses A5, ... are assigned. A control signal AC2 output from the access control section 14 is supplied to the other input terminals of the AND gates 16 and an input terminal of an inverter 17. A control signal AC1 (which is an inverted signal of the control signal AC2) output from the inverter 17 is supplied to the other input terminals of the AND gates 15. The output signals of the AND gates 15 are supplied to the registers R2 to R4 to which the addresses A2 to A4 are respectively assigned and the output signals of the AND gates 16 are supplied to the registers R1' to R3' to which the addresses A2 to A4 are respectively assigned. An R/W (read/write) control signal S is supplied to the registers Rn (n=1, 2, 3, ...) and the registers R1' to R3' so as to control the data readout and write-in operations. Data stored in the registers Rn (n=1, 2, 3, ...) and the registers R1' to R3' is transferred via the 8-bit data bus 13.

With the above construction, the registers R1' and R2, registers R2' and R3, and registers R3' and R4 which will be respectively designated by the addresses A2, A3 and A4 each assigned to two registers are selected by the logical products of the decoder signals ADO2 to ADO4 output from the address decoder section 12 and the control signal AC1 or AC2 output from the access control section 14. When the signal ADOn for specifying the address An (n=1, 2, 3, ...) becomes effective (or is set to an "H" level), the access control section 14 first sets the control signal AC1 to an "H" level and sets the control signal AC2 to an "L" level, and then, sets the control signal AC2 to the "H" level and sets the control signal AC1 to the "L" level in the succeeding cycle. When the control signals AC1 and AC2 are respectively set at the "H" and "L" levels and if the address An (n=1, 2, 3, ...) is selected, the decoder signal ADOn (n=1, 2, 3, ...) is supplied to the register Rn (n=1, 2, 3, ...) designated by the corresponding address. At this time, since the control signal AC2 is set at the "L" level, the output signals of the AND gates 16 are all set to the "L" level and the decoder signals ADO2 to ADO4 are inhibited from being supplied to the registers R1' to R3'. In the succeeding cycle set after the address updating operation is effected, if the address control section 14 detects that one of the decoder signals ADO2 to ADO4 becomes effective (or is set to the "H" level), the control signal AC2 is set to the "H" level and the control signal AC1 is set to the "L" level. Thus, the expanded registers R1' to R3' are accessed. At this time, since the output signals of the AND gates 15 are set at the "L" level, the registers R2 to R4 are prevented from being accessed.

Figure 3:
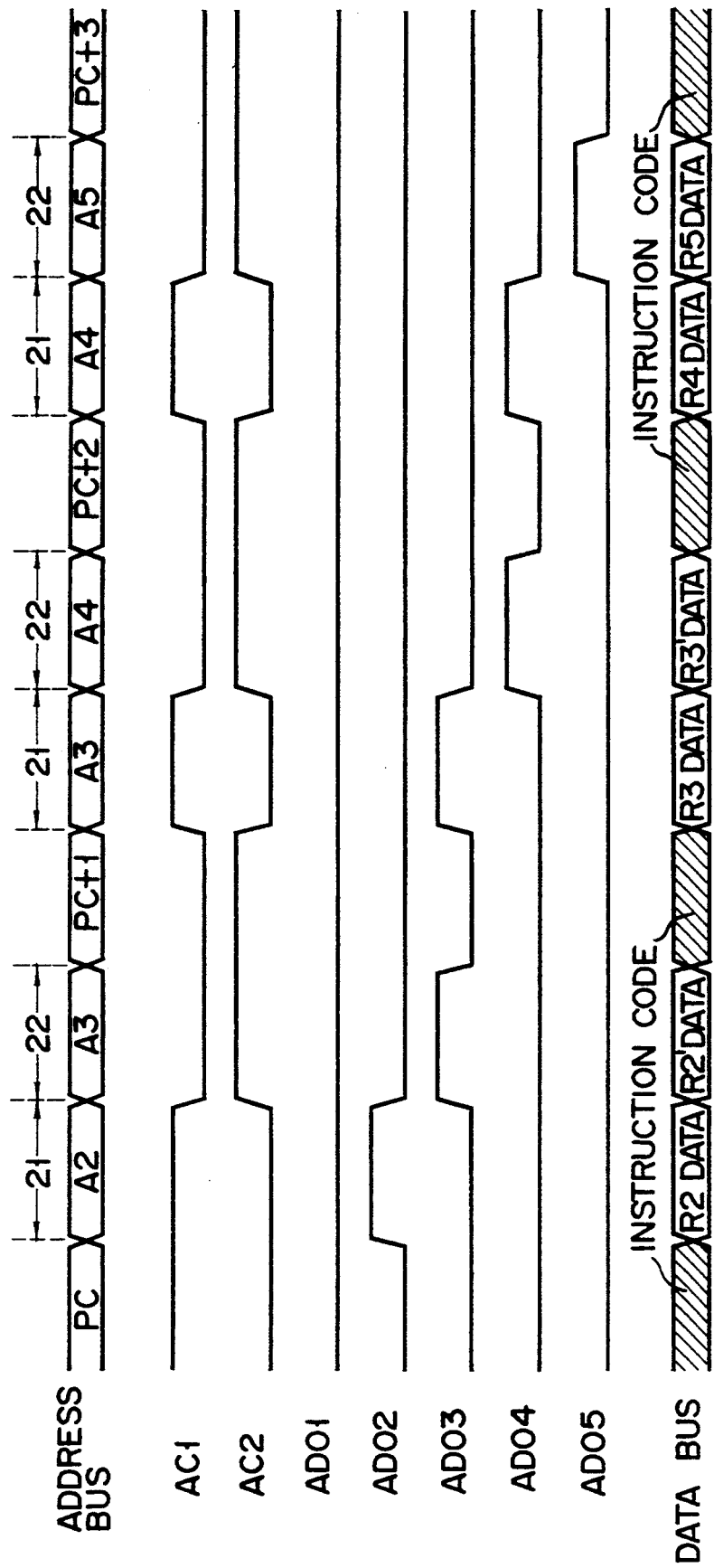
FIG. 3 is a timing chart for illustrating the operation of the circuit shown in FIG. 2.

Next, the operation of reading out data from the registers shown in FIG. 2 is explained with reference to the timing chart shown in FIG. 3. An address PC (program counter) is an address area in which the program of a CPU (not shown) is stored and is designated by an address other than that for the register area. The control signals AC1 and AC2 are controlled by the access control section 14 so as to be respectively kept at the "H" and "L" levels in a cycle succeeding to that of an address (PC+m) (m=0, 1, 2, 3).

For example, one of the addresses A1 to A4 is input in the cycle 21, one of the registers R1 to R4 is accessed by the input address. In the cycle 22 succeeding the cycle in which one of the addresses A1 to A4 is input, the control signal AC2 is always effective (or is kept at the "H" level). Therefore, if one of the addresses A2 to A4 is input in the cycle 22, one of the registers R1' to R3' is accessed by the input address.

Therefore, when the register R1 is accessed as a 16-bit register (that is, R1 and R1'), the address A3 is designated immediately after the address A2 is designated. Further, since the CPU generally executes the next instruction after the access to the register is completed, the address corresponds to a location in which the instruction code is stored and is different from that for the I/O register. In other words, the signal AC1 is always kept effective (or is kept at the "H" level) in the initial state in which the register is accessed. Thus, in a case where the added register is accessed as a 16-bit register, successive accesses are effected, and in a case where only the register having no added register is accessed as an 8-bit register, the access may be made for each byte.

In general, an 8-bit single-chip microcomputer which has 16-bit registers has a double-byte instruction. Therefore, in the access operation in which an 8-bit register is dealt with as a 16-bit register, a double-byte instruction can be used for effecting the successive accesses. When the register is accessed as a 8-bit register, the access is made by use of a single-byte instruction (for accessing for each byte).

With the above construction, since a plurality of registers can be allotted for one address, an address space can be effectively used. In the prior art, when registers are additionally provided, it is necessary to assign new addresses to the added registers and identify the addresses, but in this invention, new addresses are not necessary. Further, even if the address area is limited, it is not necessary to change the addresses which have been set before the registers or the like are additionally provided. In particular, when the register area is expanded, for example, when an 8-bit I/O register is expanded to a 16-bit I/O register by use of an 8-bit microcomputer and it has a function of successively accessing the expanded register as an instruction, the specification which can be easily understood by the user can be obtained.

In the above embodiment, the I/O register is explained as an example, but this invention can be applied to general registers or other various types of registers.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As described above, according to this invention, there can be provided a data storing device in which a plurality of registers are allotted to one address and the register area can be expanded within a limited address area since registers of a number larger than the number of addresses can be used.

What is claimed is:
1. A data storing device comprising:
first data holding means for holding data;
second data holding means set into an accessible state in a preset cycle succeeding to a cycle in which said first data holding means is accessed and set into an access inhibition state in the preset cycle succeeding to said accessible state;
third data holding means having the same address as that of said second data holding means allotted thereto and set into an access inhibition state in the preset cycle in which said second data holding means is accessed, and set into an accessible state in the preset cycle succeeding to said access inhibition state of third data holding means; and access control means for controlling permission/inhibition of access to said second and third data holding means.

2. A data storing device according to claim 1, wherein a first address is assigned to said first data holding means and a second address which is higher than the first address by one is assigned to said second and third data holding means.

3. A data storing device according to claim 1, wherein said first, second and third data holding means are used as I/O registers of a single-chip microcomputer and formed in the same chip.

4. A data storing device according to claim 1, further comprising decoder means for receiving an address signal and decoding the address signal to select said first to third data holding means.

5. A data storing device according to claim 4, wherein said access control means includes an access control section for receiving an output of said decoder means; and logic gate means for selecting one of said second and third data holding means according to an output of said decoder means and an output of said access control section.

6. A data storing device according to claim 5, wherein said logic gate means includes a first AND gate for receiving an output of said decoder means at one input terminal and receiving an output signal of said access control section at the other input terminal and supplying an output to said second data holding means; and a second AND gate for receiving an output of said decoder means at one input terminal and receiving an inverted signal of the output signal of said access control section at the other input terminal and supplying an output to said third data holding means.

* * * * *